(12) United States Patent
Kim

(10) Patent No.: US 11,291,326 B2
(45) Date of Patent: Apr. 5, 2022

(54) NET DRUM AND JUICER FOR JUICE EXTRACTION COMPRISING SAME

(71) Applicant: Hurom Co., Ltd., Gimhae-si (KR)

(72) Inventor: Jae-Won Kim, Gimhae-si (KR)

(73) Assignee: Hurom Co., Ltd., Gimhae-si (KR)

( * ) Notice: Subject to any disclaimer, the term of this patent is extended or adjusted under 35 U.S.C. 154(b) by 984 days.

(21) Appl. No.: 14/894,342

(22) PCT Filed: Aug. 26, 2013

(86) PCT No.: PCT/KR2013/007621
§ 371 (c)(1),
(2) Date: Nov. 26, 2015

(87) PCT Pub. No.: WO2014/193036
PCT Pub. Date: Dec. 4, 2014

(65) Prior Publication Data
US 2016/0088969 A1    Mar. 31, 2016

(30) Foreign Application Priority Data

May 27, 2013 (KR) .................... 10-2013-0059475

(51) Int. Cl.
*A47J 19/02* (2006.01)
*A47J 19/06* (2006.01)
(52) U.S. Cl.
CPC ........... *A47J 19/027* (2013.01); *A47J 19/025* (2013.01); *A47J 19/06* (2013.01)
(58) Field of Classification Search
CPC ......... A47J 19/02; A47J 19/06; A47J 19/025; A47J 19/027; A23N 1/02; A23N 1/00
(Continued)

(56) References Cited

U.S. PATENT DOCUMENTS 6,854,382 B2 *   2/2005   Jan .......................... A23N 1/00
                                                    100/117
8,826,811 B2 *   9/2014   Kim ...................... A47J 19/025
                                                    100/117
(Continued)

FOREIGN PATENT DOCUMENTS

CN          202843270         4/2013
KR      20-2000-0024760       2/2001
(Continued)

OTHER PUBLICATIONS

International Search Report and the Written Opinion dated Feb. 19, 2014 From the Korean Intellectual Property Office Re. Application No. PCT/KR2013/007621 and its Translation of Search Report in English.
(Continued)

*Primary Examiner* — Ibrahime A Abraham
*Assistant Examiner* — Spencer H. Kirkwood

(57) ABSTRACT

The present invention relates to a mesh drum and a juice extractor including the same. The mesh drum according to the present invention includes: a mesh plate formed in a cylindrical hollow shape and is gradually reduced in diameter as it goes toward the bottom from the top, and having at least one mesh holes formed on a side wall thereof; at least one wall blades formed on an inner circumferential surface of the mesh plate in the longitudinal direction of the mesh drum in such a manner as to position in proximity to a feed screw rotating inside the mesh plate; and at least one grinding blades formed on the inner circumferential surface of a lower portion of the mesh plate. The juice extractor according to the present invention includes the mesh drum, a main body, a feed screw, a housing, and cover.

14 Claims, 3 Drawing Sheets

(58) Field of Classification Search
USPC .......................................................... 99/511
See application file for complete search history.

(56) References Cited

U.S. PATENT DOCUMENTS

| | | | | |
|---|---|---|---|---|
| 2013/0074707 | A1* | 3/2013 | Asbury | ............ A47J 19/02 |
| | | | | 99/495 |
| 2013/0074708 | A1* | 3/2013 | Asbury | ............ A47J 19/025 |
| | | | | 99/513 |

FOREIGN PATENT DOCUMENTS

| KR | 20-0259820 | | 1/2002 | | |
|---|---|---|---|---|---|
| KR | 20-0327888 | | 9/2003 | | |
| KR | 20030087661 | A * | 11/2003 | | |
| KR | 20060101848 | A * | 9/2006 | | |
| KR | 10-0793852 | | 1/2008 | | |
| KR | 10-1074420 | | 10/2011 | | |
| KR | 10-1099429 | | 12/2011 | | |
| KR | 10-2012-0012040 | | 2/2012 | | |
| KR | 10-2012-0016532 | | 2/2012 | | |
| KR | 10-2012-0024042 | | 3/2012 | | |
| KR | 10-1142407 | | 5/2012 | | |
| KR | 20120048224 | A * | 5/2012 | ............ | A47J 19/025 |
| KR | 20120048224 | A * | 5/2012 | ............ | A47J 19/025 |
| KR | 10-1202775 | | 11/2012 | | |
| KR | 101202775 | B1 * | 11/2012 | ............... | A23N 1/02 |
| KR | 10-2103-0028535 | | 3/2013 | | |
| KR | 10-1257441 | | 4/2013 | | |
| KR | 10-1343599 | | 12/2013 | | |
| TW | 201249379 | | 12/2012 | | |
| WO | WO 2010/128256 | | 11/2010 | | |
| WO | WO 2012/165713 | | 12/2012 | | |
| WO | WO 2013/062166 | | 5/2013 | | |

OTHER PUBLICATIONS

Naver Blog "Meet the Galaxy Extractor", Naver Blog, Products Description, p. 1-48, Mar. 31, 2012 & English Translation.

* cited by examiner

[Fig. 1]
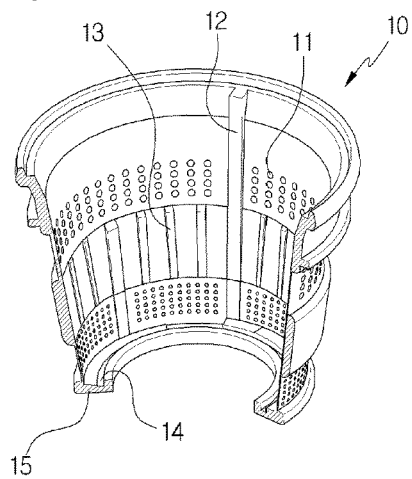
[Fig. 2]
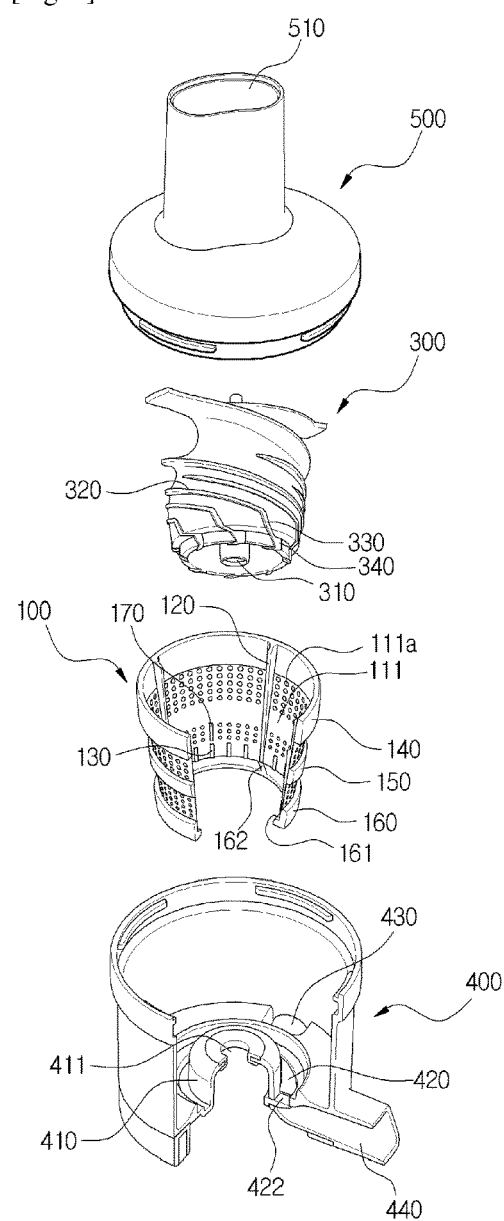

[Fig. 3a]
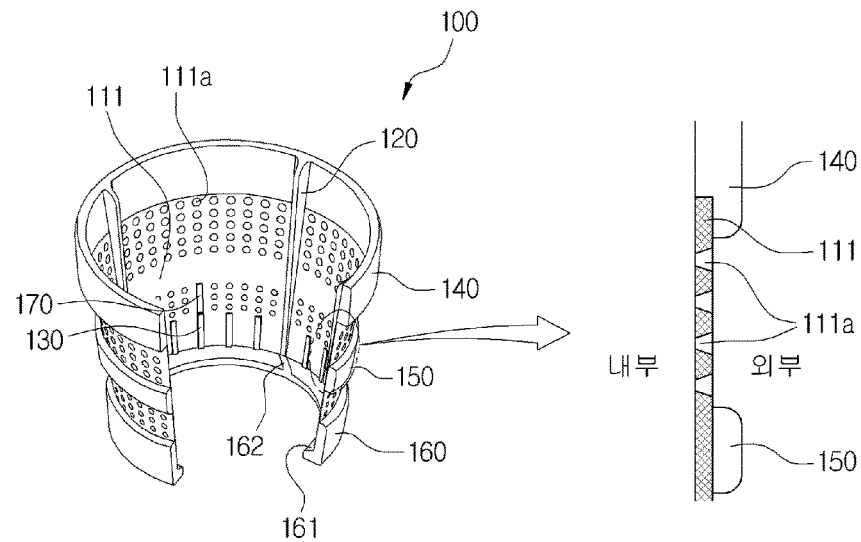
내부 외부
[Fig. 3b]
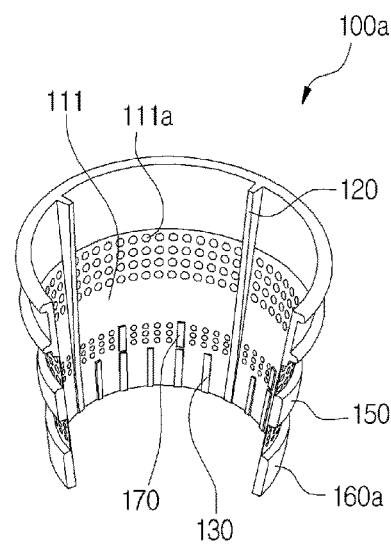
[Fig. 3c]
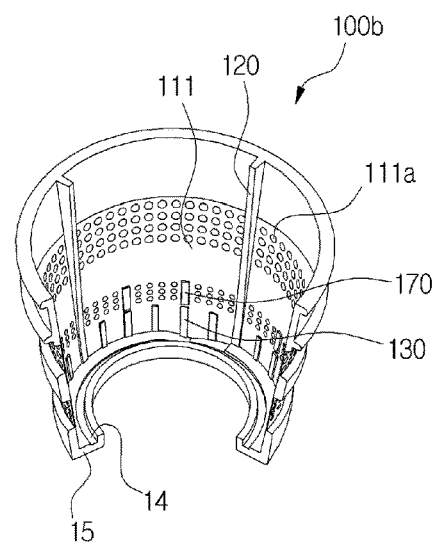

[Fig. 4]
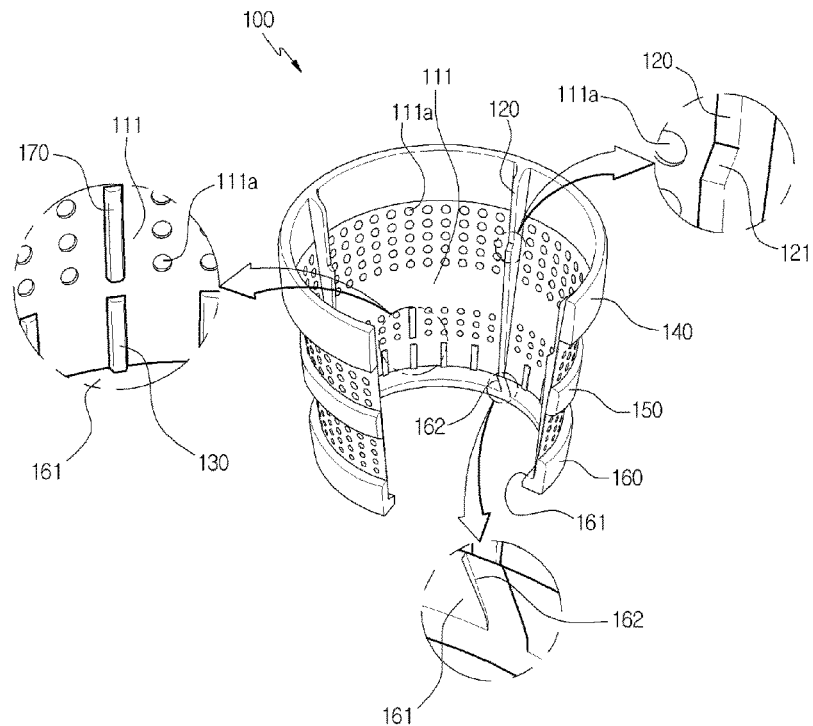
[Fig. 5]
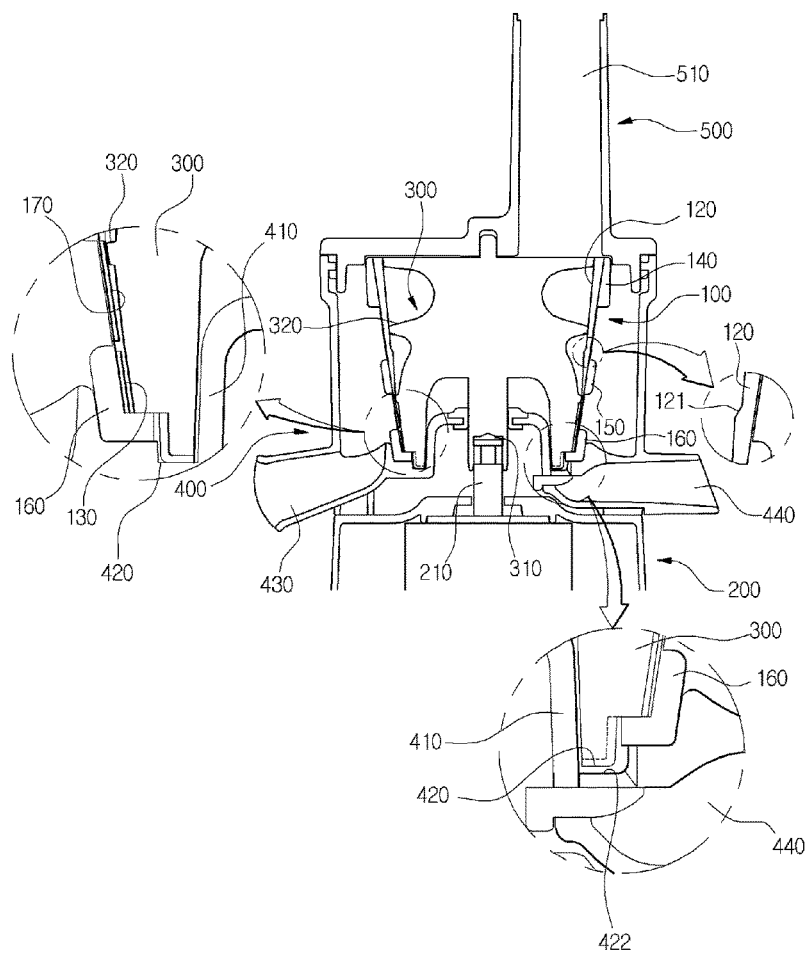

NET DRUM AND JUICER FOR JUICE EXTRACTION COMPRISING SAME

RELATED APPLICATIONS

This application is a National Phase of PCT Patent Application No. PCT/KR2013/007621 having International filing date of Aug. 26, 2013, which claims the benefit of priority of Korean Patent Application No. 10-2013-0059475 filed on May 27, 2013. The contents of the above applications are all incorporated by reference as if fully set forth herein in their entirety.

FIELD AND BACKGROUND OF THE INVENTION

The present invention relates to a mesh drum and a juice extractor including the same. More particularly, the present invention relates to a mesh drum and a juice extractor including the same, in which material transfer efficiency within the mesh drum can be increased to improve a juice extraction rate, the amount of draff or residue remained in the mesh drum after extracting juice can be reduced effectively, and the charge of a raw material and the discharge of the draff during juice extraction can be carried out effectively.

In general, juicers can be used as household appliances that enable a user to simply extract green vegetable juice or fruit juice from vegetables or fruits therethrough and to take the extracted juice at home.

Such an existing juicer presses and crushes a raw material put into an inlet port or a feed tube at high speed and produce juice from the crushed material using a centrifugal separation method. However, the existing juicers have drawbacks in that intrinsic flavor and nutrients contained in the material may be destroyed during such a high-speed crushing process, and it is difficult to extract green vegetable juice from vegetables having stems or leaves. It is also difficult to extract fruit juice from fruits having a high viscosity such as kiwis or strawberries, and it is impossible to extract soybean milk from soybeans.

In addition, it is indispensable that the inside of the juicer for processing foods should be maintained in a clean state, and a juicer washing and cleansing process should be carried out in a simple and easy manner. If food adheres to the inner wall of the juicer, it will be easily rotten and bacteria will proliferate. Thus, it is necessary that the internal components of the juicer should be disassembled and cleaned easily.

Korean Utility Model Registration No. 190676 discloses a juice extractor having a grinding function, in which the conventional juice extractor is provided with a feed screw horizontally assembled with a drum together with a juice-extracting net and a drum cap and engaged with a sidewall of a drive unit. Thus, the juice extractor performs the juice extraction when a raw material put into the mesh drum through an inlet port are horizontally transferred at low speed.

Thus, the juice extractor disclosed in Korean Utility Model Registration No. 190676 has drawbacks in that a large space is required in using or keeping the juice extractor, and in that since juice is extracted from a raw material along with the horizontal movement thereof, the juice extraction speed becomes low, and thick juice having a high viscosity does not flow downwardly smoothly, but may be collected in the drum. Also, there is a problem in that since the feed screw has no rotary shaft at one end thereof, the end of the feed screw may be shaken when being rotated, and thus collide with wall blades formed on an inner wall of the juice-extracting net to cause noise and abrasion of the feed screw to occur.

Further, the juice extractor is necessarily required to be disassembled and washed after its use in order to solve sanitary problems which may occur by the material remained inside the juice extractor and prevent damage of components of the juice extractor. Therefore, there is a need for improvement of workability, safety, and durability according to the disassembling and assembling of the juice extractor.

In an attempt to solve such problems, Korean Patent Registration No. 793852 discloses a technology related to a juice extractor. Such a juice extractor produces soybean milk from soybeans using the principle of a millstone which grinds, presses and squeezes the beans, and makes fruit juice from fruits having a high viscosity such as tomatoes, kiwis, or strawberries by grinding, pressing and crushing the fruits over a grater. In addition, since a housing of the juice extractor is vertically coupled to an upper side of a drive, a large space is not required to use or keep the juice extractor. Moreover, the material is naturally moved downwardly due to gravity as a feed screw is rotated. Thus, since the juice extraction speed is high and the juice collection phenomenon does not occur, juice can be promptly extracted effectively from various kinds of vegetables or fruits.

However, the juice extractor disclosed in Korean Patent Registration No. 793852 encounter problems in that residue after juice extraction remains in the mesh drum to cause the juice extraction material to be lost, and the residue discarded to the outside during the disassembling and washing of the juice extractor is discharged in a large amount, thus make a user discontent.

FIG. 1 is a perspective view showing the configuration of a mesh drum included in the juice extractor disclosed in Korean Patent Registration No. 793852. The conventional mesh drum 10 is formed in a cylindrical hollow shape, and has a plurality of mesh holes 11 penetratingly formed on a side wall thereof and more than two wall blades 12 longitudinally formed on an inner circumferential surface thereof. Grinding blades 13 are protrudingly formed in plural numbers on the inner circumferential surface of an intermediate portion of the mesh drum 10 together with the wall blades 12, and a bottom ring 15 having an annular discharge groove 14 formed thereon is formed at a lower end of the mesh drum 10.

Thus, in a process in which the material is put into the mesh drum 10 and then are rotated in a spiral shape by the rotation of the feed screw (not shown), when the material caught by the wall blades 12, a downward transfer force is exerted to the material by screw spirals to cause the material to be squeezed while being transferred downwardly inside the mesh drum 10.

However, the conventional juice extractor entails problems in that the grinding blades 13 formed on the mesh drum 10 are positioned on the inner circumference of the intermediate portion of the mesh drum 10, so that when the material is finely grinded into small particles by the grinding blades 13 at an intermediate height of the mesh drum 10, the material rotated in a spiral shape by the rotation of the feed screw is not caught by the wall blades 12 due to the small particle size and thus the downward transfer force is not exerted to the material to cause the material to be accumulated in the mesh drum 10 while being rotated as they are together with the feed screw without being not transferred downwardly.

In addition, when a large amount of the material from which juice is not extracted are accumulated in the mesh drum 10, a pressure applied to the material at a low portion of the mesh drum 10 is relatively reduced to cause the juice extraction rate to be decreased. Besides, when the raw material is additionally put into the mesh drum 10, they are not smoothly supplied to the inside of the mesh drum 10 due to the material accumulated in the mesh drum 10. Consequently, a user suffers from an inconvenience having to forcibly pressing a pusher so as to put the material into the mesh drum 10.

SUMMARY OF THE INVENTION

Accordingly, the object of the present invention is to provide a mesh drum and a juice extractor including the same, in which grinding blades are formed on the inner circumferential surface of a lower portion of a mesh drum to facilitate the transfer of a raw material by the feed screw, the materials are finely grinded and squeezed to increase a juice extraction rate, and the material can be smoothly put into the mesh drum.

To accomplish the above object, there is provided a mesh drum that includes: a mesh plate formed in a cylindrical hollow shape which is opened vertically and is gradually reduced in diameter as it goes toward the bottom from the top, and having at least one mesh holes formed on a side wall thereof so as to penetrate through the inner and outer wall surfaces thereof; at least one wall blades formed protrudingly on an inner circumferential surface of the mesh plate in the longitudinal direction of the mesh drum in such a manner as to position in proximity to screw spirals of a feed screw rotating inside the mesh plate; and at least one grinding blades formed on the inner circumferential surface of a lower portion of the mesh plate in the longitudinal direction of the mesh drum.

More preferably, in the mesh drum of the present invention, the mesh plate includes at least one reinforcing ribs protrudingly formed on the inner and outer circumferential surfaces thereof so as to position above the grinding blades.

More preferably, in the mesh drum of the present invention, the mesh plate includes a reinforcing ring formed on the outer circumferential surface thereof so as to prevent deformation of the mesh plate.

More preferably, in the mesh drum of the present invention, the outer circumferential surface of a lower end of the mesh plate is reinforced by a lower end ring, and the grinding blades are longitudinally formed in plural numbers on the inner circumferential surface of the lower end ring in such a manner as to be spaced apart from one another.

According to a more preferable embodiment, the lower end ring is partially bent inwardly at a lower end thereof to form the bottom ring, and the bottom ring includes at least one guides formed protrudingly upwardly from the top of the inner circumferential surface thereof.

According to a preferable embodiment, in the mesh drum of the present invention, the bottom ring has an annular discharge groove formed on the top surface thereof so as to allow the draff to be discharged therethrough.

More preferably, in the mesh drum of the present invention, the diameter of the mesh holes formed on the lower portion of the mesh plate is formed smaller than that of the mesh holes formed on the upper portion of the mesh plate.

More preferably, in the mesh drum of the present invention, the mesh holes formed on the mesh plate are increased in diameter as it goes toward the outside from the inside of the mesh plate.

According to a preferable embodiment, in the mesh drum of the present invention, the each wall blade has a stepped part stepwise projected radially from the outer surface thereof at the intermediate portion of the mesh plate.

According to a preferable embodiment, in the mesh drum of the present invention, the protruding height of each wall blade is formed in such a manner that the wall blade is gradually inclined downwardly as it goes toward the bottom from the top of the mesh drum.

In addition, there is provided a juice extractor including: said mesh drum; a main body in which a motor as a drive source is mounted and from which a drive shaft of the motor is extended to the outside; a feed screw connected to the drive shaft to receive a rotary force from the drive shaft, accommodated surroundingly in the mesh drum, and having screw spirals protrudingly formed on the outer circumferential surface thereof so as to be inclined downwardly; a housing coupled to an upper portion of the main body so as to allow the mesh drum and the feed screw to be accommodated therein, the housing including: a hollow through-part protrudingly formed at the center of a lower portion thereof, the hollow through-part having a through-hole formed at the center of an upper portion thereof so as to allow the drive shaft to pass therethrough and an annular discharge groove formed at the outer peripheral edge of a lower portion thereof; and a draff outlet port and a juice outlet port formed respectively at one side and the other side of the discharge groove so as to be spaced apart from each other and fluidically communicate with the outside; and a cover detachably coupled to the upper portion of the housing and including an inlet port formed at an upper portion thereof.

More preferably, in the juice extractor of the present invention, the feed screw includes at least one crushing spirals formed at the lower portion thereof to correspond to the grinding blades of the mesh drum in such a manner as to have an inclined angle larger than that of the screw spirals of the feed screw and extend downwardly from the screw spirals.

According to a preferable embodiment, in the juice extractor of the present invention, the annular discharge groove is connected to a draff descending hole, and is gradually increased in depth as it goes toward the draff descending hole.

More preferably, in the juice extractor according to the present invention further includes a rotary brush positioned between the housing and the mesh drum and opened at the top and bottom thereof, the rotary brush including a blade made of a soft material formed at a side thereof so as to be brought into close contact at a distal end thereof with the inner circumferential surface of the housing and the outer circumferential surface of the mesh drum.

The mesh drum and the juice extractor including the same in accordance with embodiments of the present invention as constructed above have the following advantages.

Grinding blades are positioned on the circumferential surface of a lower portion of the mesh drum, where mesh holes are not formed so that fine grinding the fine grinding process is performed, thereby improving a transfer efficiency of the material transferred downwardly by the feed screw as well as a compression force at the lower portion of the mesh drum. In addition, the material is further finely grinded by the grinding blades positioned on the circumferential surface of the lower portion of the mesh drum so that juice contained in the material can be extracted maximally. In addition, since the material is not accumulated in the mesh drum, it is easily put into the mesh drum.

BRIEF DESCRIPTION OF THE DRAWINGS

The above objects, other features and advantages of the present invention will become more apparent by describing the preferred embodiments thereof with reference to the accompanying drawings, in which:

FIG. 1 is a partially-cut perspective view showing main elements of a mesh drum which is applied to a conventional juice extractor in accordance with the prior art; and FIG. 2 is an exploded perspective view showing a juice extractor including a mesh drum in accordance with one embodiment of the present invention;

FIG. 3a is a partially-cut perspective view showing a mesh drum in accordance with one embodiment of the present invention;

FIG. 3b is a partially-cut perspective view showing a mesh drum in accordance with another embodiment of the present invention;

FIG. 3c is a partially-cut perspective view showing a mesh drum in accordance with still another embodiment of the present invention;

FIG. 4 is a partially-cut perspective view showing another example of wall blades formed on a mesh drum in accordance with one embodiment of the present invention; and FIG. 5 is an enlarged cross-sectional view showing a juice extractor including a mesh drum in accordance with one embodiment of the present invention.

* Explanation on reference numerals of main elements in the drawings *

| | |
|---|---|
| 10, 100, 100a, 100b: mesh drum | 111: mesh plate |
| 111a: mesh holes | 120: wall blades |
| 130: grinding blades | 140: upper end ring |
| 150: reinforcing ring | 160, 160a: lower end ring |
| 15, 161: bottom ring | 162: guide |
| 170: reinforcing rib | 200: main body |
| 300: feed screw | 320: screw spirals |
| 330: crushing spirals | 340: screw discharge step |
| 400: housing | 410: hollow through-part |
| 420: annular discharge groove | 422: draff descending hole |
| 430: juice outlet port | 440: draff outlet port |
| 500: cover | |

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In the drawings, for the sake of a clearer understanding of the present invention, sizes or shapes of elements illustrated in the drawings may be exaggerated for clarity and convenience. Also, the following terms particularly defined in consideration of the configuration and function of the present invention may vary according to an intention of a user or an operator or according to custom. Therefore, definition of such terms should be made based on overall contents of the specification.

First, a mesh drum in accordance with an embodiment of the present invention includes a mesh plate that defines a sidewall of the mesh drum has a plurality of mesh holes formed thereon, a plurality of wall blades formed protrudingly on an inner circumferential surface of the mesh plate in the longitudinal direction of the mesh drum, and a plurality of grinding blades formed on the inner circumferential surface of a lower portion of the mesh drum.

The above construction of the mesh drum will be described hereinafter with reference to FIGS. 2, 3a, 3b and 3c.

The mesh drums 100, 100a and 100b are formed in a cylindrical hollow shape which is opened vertically so as to allow a feed screw to be accommodated therein and is gradually reduced in diameter as it goes toward the bottom from the top at its entirety. The sidewalls of the mesh drums 100, 100a and 100b are constructed as a thin mesh plate 111 which has a plurality of mesh holes 111a formed thereon so as to penetrate through the inner and outer wall surfaces thereof. The mesh holes 111a serves to discharge juice extracted from a raw material to the outside from the inside of the mesh drums 100, 100a and 100b.

A feed screw 300 is accommodated in the mesh drums 100, 100a and 100b, and thus the volume defined between the mesh drums 100, 100a and 100b and the feed screw 300 is reduced gradually as it goes toward the bottom from the top of the mesh drums and a compression force is increased gradually as it goes toward the bottom from the top of the mesh drums. In addition, the size of the material is reduced gradually as it goes toward the bottom from the top.

Thus, the diameter of the mesh holes 111a formed on the lower portion of the mesh plate 111 is formed smaller than that of the mesh holes 111a formed on the upper portion of the mesh plate 111 so that the discharge of fine draff to the outside of the mesh drums 100, 100a and 100b through the mesh holes 111a can be minimized. In addition, the mesh plate 111 is preferably made thin so that the size of the mesh holes 111a becomes small.

Preferably, the mesh holes 111a may be increased in diameter as it goes toward the outside from the inside of the mesh plate 111 in order to prevent the mesh holes from being clogged by the fine draff in the juice extraction process.

Meanwhile, since the material is transferred downwardly by the rotation of the feed screw 300 inside the mesh drums 100, 100a and 100b and the distance defined between the feed screw 300 and the inner circumferential surfaces of the mesh drums 100, 100a and 100b and is reduced gradually as it goes toward the bottom from the top, the material is compressed gradually and a compression force according to this compression of the material is increased gradually as it goes toward the bottom from the top of the mesh drums. Likewise, the compression force exerted to the material is increased gradually as it goes toward the bottom from the top of the mesh drums 100, 100a and 100b, and thus there may be caused a problem in that a thin mesh plate 111 employed to have small mesh holes 111a formed thereon is deformed or damaged.

Accordingly, a reinforcing ring 150 is formed on the outer circumferential surface of the mesh plate 111 to prevent deformation and damage of the mesh plate 111. In one embodiment of the present invention, an upper end ring 140, a lower end ring 160, and the reinforcing ring 150 are formed on the circumferential surfaces of an upper end portion, a lower end portion, and an intermediate portion of the mesh drums 100, 100a and 100b, respectively, in such a manner as to circumferentially surround the upper end portion, the lower end portion, and the intermediate portion in order to prevent the mesh plate 111 from being deformed or damaged by the compression force.

Further, the formation position of the upper end ring 140, the lower end ring 160, and the reinforcing ring 150 may vary depending on the strength of the compression force applied to the mesh drums 100, 100a and 100b and the position to which the compression force is transmitted. Preferably, the upper end ring 140, the reinforcing ring 150, or the lower end ring 160 may be formed in a band shape having a constant vertical width in consideration of the deformation of the mesh plate 111 according to the compression force.

Moreover, the mesh plate 111 as a single thin sheet plate is preferably formed of a high-strength stainless steel material harmless to the human body.

In the meantime, the wall blades 120 function to downwardly transfer and primarily crush the material charged into the mesh drums 100, 100a and 100b. To this end, the wall blades 120 are formed protrudingly on the inner circumferential surface of the mesh plate in the longitudinal direction of the mesh drums 100, 100a and 100b. The protruding height of the wall blades 120 may be formed to be identical to as it goes toward the bottom from the top of the mesh drums, but the wall blades 120 are formed in a shape which is gradually reduced in height as it goes toward the bottom from the top of the mesh drums in this embodiment.

In the illustrative drawings of the present invention, several wall blades 120 are formed on the inner circumferential surface of the mesh drums 100, 100a and 100b. The number and arrangement of the wall blades 120 need not to be limited to any specific one, but may be modified in various manners depending on needs in consideration of design conditions and juice extraction efficiency.

In addition, the formation direction of the wall blades 120 does not need to be limited to a vertical downward direction as a longitudinal direction of the mesh drums 100, 100a and 100b, but the wall blades 120 may be implemented in an inclined shape intersecting with screw spirals 320 of the feed screw 300 and having a constant gradient so as to perform the efficient transfer and primary crushing of the material.

More preferably, each wall blade 120 is gradually inclined downwardly as it goes toward the bottom from the top of the mesh drum 100, and may have a stepped part 121 stepwise projected radially from the outer surface thereof at the intermediate portion of the mesh plate 111 as shown in FIG. 4. The position and number or the protruding height of the stepped part 121 of the wall blade 120 may be modified in various manners depending on the shape of the feed screw 300 and the design conditions of the screw spirals 320.

The grinding blades 130 act to secondarily crush the material, which is transferred downwardly while juice is extracted from the material, into fine and uniform particles by the rotation of the feed screw 300 accommodated in the mesh drums 100, 100a and 100b. The grinding blades are formed on the inner circumferential surface of the lower portion of the mesh drum in the longitudinal direction of the mesh drums 100, 100a and 100b. Specifically, the grinding blades 130 are protrudingly formed equidistantly in plural numbers on the inner circumferential surface of the lower portion of the mesh plate 11, which the mesh holes 111a are not formed.

If the grinding blades 130 are positioned on the inner circumferential surface of the intermediate portion of the mesh drums 100, 100a and 100b, the material is abruptly crushed into fine particles at the intermediate portion of the mesh plate 111 inside the mesh drums 100, 100a and 100b, so that when the feed screw 300 is rotated, the crushed material with a fine size is not caught by the wall blades 120 but are rotated along with the screw spirals 320 of the feed screw 300. As a result, the material is not smoothly transferred downwardly along the screw spirals 320 of the feed screw 300 and is accumulated inside the mesh drums 100, 100a and 100b. As such, when the material is accumulated inside the mesh drums 100, 100a and 100b, the accumulation of the material is further increased due to the material subsequently charged into the mesh drums, and resultantly a problem is caused in that a user suffers from an inconvenience of having to forcibly pressing the material using a tool such as a pusher to charge or put them into the mesh drums.

Thus, the present invention is constructed such that the grinding blades 130 are formed on the inner circumferential surface of the lower portion of the mesh drums 100, 100a and 100b so that the material can be downwardly transferred effectively by the screw spirals 320 of the feed screw 300 and the wall blades 120 by being subjected to a stepwise size change without any abrupt size change, and then can be further finely crushed by the grinding blades 130 at the lower portion of the mesh drums 100, 100a and 100b.

In addition, in the case where the grinding blades 130 are positioned at the intermediate portion of the mesh drums 100, 100a and 100b as in the prior art, the particles of the material crushed at the intermediate portion of the mesh plate 111 merely adhere to the outer circumferential surface of the feed screw 300 and are not transferred downwardly effectively by the feed screw 300 and the wall blades 120. Thus, the material is densely accumulated inside the mesh drums 100, 100a and 100b, resulting in a deterioration of a juice extraction efficiency.

On the contrary, in the present invention, the grinding blades 130 are formed on the circumferential surface of the lower portion of the mesh drums 100, 100a and 100b so that the material put into the mesh drums are effectively moved from the bottom to the top of the mesh drums 100, 100a and 100b by the feed screw 300 and the wall blades 120 to cause the compression force to be gradually increased. In this case, juice produced by a squeezing phenomenon due to the compression force is discharged to the outside of the mesh drums while being filtered by the mesh holes 111a formed on the mesh plate 111 so as to achieve an effective juice extraction.

In addition, the material transferred downwardly while being squeezed are further finely crushed by the grinding blades 130 formed on the inner circumferential surface of the lower portion of the mesh drums 100, 100a and 100b, and are strongly compressed by a transfer compression force applied to the material from the top, at which time the level of the produced juice rises slowly to cause the juice to be discharged to outside of the mesh drums through the mesh holes 111a formed above the grinding blades 130, leading to an increase in the juice extraction efficiency.

In the meantime, according to one embodiment of the present invention, the lower end ring 160 may be partially extended bent inwardly from a lower end thereof to form the bottom ring 161, and the grinding blades 130 may be longitudinally protrudingly formed in plural numbers on the inner circumferential surface of the mesh drums 100, 100a and 100b in proximity to the lower end ring 160 in such a manner as to be spaced apart from one another as shown in FIG. 3a.

In addition, according to an embodiment shown in FIG. 3b, a lower end ring 160a is formed in a ring shape having a predetermined width on the outer circumferential surface of the lower portion of the mesh plate 111 of the mesh drums 100, 100a and 100b, and the shape of the grinding blades 130 in this embodiment is the same as that of the grinding blades 130 in the above embodiment.

Further, as shown in FIG. 3c, according to another embodiment of the present invention, a bottom ring 15 is formed by partially inwardly bending a lower ring at a lower end thereof, and a plurality of grinding blades 130 may be protrudingly formed on the inner circumferential surface of the lower portion of the mesh drum 100b in such a manner as to be spaced apart from one another by applying the conventional mesh drum with an annular discharge groove 14, shown in FIG. 1, on top of the bottom ring 15.

The grinding blades 130 are not limited to that are formed on the three types of the mesh drums 100, 100a and 100b as described above, but may be formed at the lower end of the mesh drum according to various modifications.

Meanwhile, the compression force is generated in the process in which the material is transferred and crushed by the screw spirals 320 of the feed screw 300 and the wall blades 120, and is increased gradually as it goes toward the bottom from the top of the mesh drums, which may deform the lower portion of the mesh plate 111. Thus, a plurality of reinforcing ribs 170 needs to be disposed along the circumferential wall surface of the lower power of the mesh plate 111 so as to be spaced apart from one another to prevent the lower portion of the mesh plate 111 from being deformed. In this case, the reinforcing ribs 170 are preferably positioned just above the grinding blades 130 to which a stronger compression force is applied.

The reinforcing ribs 170 may be integrally formed protrudingly by a method such as press machining or the like. In this case, the reinforcing ribs 170 may be formed on the outer circumferential surface of the mesh plate 111, but is preferably protrudingly formed on the inner circumferential surface of the mesh plate 111 so that when the screw spirals 320 of the feed screw 300 approach the reinforcing ribs 170 during the rotation of the feed screw 300, the reinforcing ribs 170 serves to reinforce the mesh drums 100, 100a and 100b as well as transfer downwardly or crush the material such as the wall blades 120 or the grinding blades 130.

Further, it will be obvious to a person of ordinary skill in the art that the number, the arrangement, the length, and the shape of the grinding blades 130 and the reinforcing rib 170 do not need to be limited to specific ones, and may be modified in various manners depending on the design conditions of the mesh drums 100, 100a and 100b and the feed screw 300.

Meantime, in the present invention, there is also provided a juice extractor that includes the mesh drums 100, 100a and 100b each including the mesh plate 111, the wall blades 120, and the grinding blades 130, a main body 200, a feed screw 300, a housing 400, and a cover 500. Herein, the juice extraction can be defined as including an entire step of cutting, crushing, and squeezing the material to extract juice from the material. Such a juice extractor extracts juice from fruits or vegetables. The juice extractor will be described hereinafter in detail with reference to FIGS. 2 and 5.

The juice extractor can include: the mesh drum 100 as described above; a main body 200 in which a motor as a drive source is mounted and from which a drive shaft 210 of the motor is extended to the outside; a feed screw 300 connected to the drive shaft 210 and having a shaft hole 310 formed at a lower end portion thereof to receive a rotary force from the drive shaft 210 of the main body 200, accommodated surroundingly in the mesh drum 100, and having screw spirals 320 protrudingly formed on the outer circumferential surface thereof so as to be inclined downwardly; a housing 400 coupled to an upper portion of the main body 200 so as to allow the mesh drum and the feed screw to be accommodated therein, the housing including: a hollow through-part 410 protrudingly formed at the center of a lower portion thereof, the hollow through-part 410 having a through-hole 411 formed at the center of an upper portion thereof so as to allow the drive shaft 210 to pass therethrough and an annular discharge groove 420 formed at the outer peripheral edge of a lower portion thereof; a draff outlet port 440 formed at one side of the discharge groove 420 so as to fluidically communicate with the outside; and a juice outlet port 430 formed at the other side of the discharge groove 420 so as to fluidically communicate with the outside; and a cover 500 detachably coupled to the upper portion of the housing 400 and including an inlet port 510 formed at an upper portion thereof.

Herein, preferably, the annular discharge groove 420 formed on the housing 400 is connected to a draff descending hole 422, and may be formed in such a manner as to be gradually increased in depth as it goes toward the draff descending hole 422.

In addition, this juice extractor may further include a rotary brush (not shown) that serve to perform a combined function of washing the mesh holes 111a formed on the inner circumferential surface of the housing 400 and the mesh plate 111 and extracting juice from the material. The rotary brush is positioned between the housing 400 and the mesh drums 100, 100a and 100b, and is connected to any one part art of the feed screw 300 directly or indirectly so that it can be rotated together with the feed screw 300. The rotary brush includes a blade made of a soft material formed at a side thereof so as to be brought into close contact with the inner circumferential surface of the housing 400 and the outer circumferential surface of the mesh drums 100, 100a and 100b.

In the juice extractor, when a raw material is charged into the inlet port 510 of the cover 500, they are introduced into the mesh drum 100, 100a and 100b and then are squeezed and crushed while being forcibly transferred downwardly by the screw spirals 320 of the feed screw 300 rotating by the drive of the main body 200 and the wall blades 120. In this process in which the material is squeezed and crushed, juice produced from the material escapes to the outside of the mesh drums 100, 100a and 100b through the mesh holes 111a of the mesh plates 111, and then is discharged to the outside of the housing 400 via the juice outlet port 430.

In addition, the material charged into the inlet port 510 is primarily squeezed and crushed while being transferred downwardly by the screw spirals 320 of the feed screw 300 and the wall blades 120, and then are collected at the lower portion of the mesh plate 111 of the mesh drums 100, 100a and 100b. Thus, the collected material is secondarily squeezed and crushed by crushing spirals 330 and the grinding blades 130 formed on the inner circumferential surface of the lower portion of the mesh drums 100, 100a and 100b. Draff produced in the process is discharged to the outside of the housing 400 through the draff outlet port 440 along the annular discharge groove 420.

In the meantime, in the process in which the material is secondarily crushed by the grinding blades 130 and the material is squeezed by the transfer compression force applied thereto from the top, the level of the juice produced from the material rises to the mesh holes 111a formed above the grinding blades 130 so that the juice is discharged to the outside of the mesh drums through the mesh holes 111a and is moved to the juice outlet port 430, and the draff is moved to the draff outlet port 440 along the annular discharge groove 420 in a state in which juice is removed from the draff maximally.

Meanwhile, as in the embodiment shown in FIG. 4, in the case where the lower end ring 160 is partially bent inwardly at a lower end thereof to form the bottom ring 161, the draff grinded by the grinding blades 130 is not immediately moved to the annular discharge groove 420 of the housing 400 but is moved along the annular discharge groove 420 of the housing 400 while staying by interference of the bottom ring 161. Thus, the grinding time according to the transfer delay of the draff is secured sufficiently to increase a material crushing efficiency of the grinding blades 130 and improve the juice extraction rate.

Further, the bottom ring 161 of the lower end ring 160 includes a plurality of spiral guides 162 formed protrudingly upwardly from the top of the inner circumferential surface thereof so as to be oriented toward the center of the mesh drums 100, 100a and 100b, so that when the draff is not moved downwardly along the top surface of the bottom ring 161 but is circulated repeatedly along the top surface of the bottom ring 161 by a rotary force of the feed screw 300, it can be correctly guided to the annular discharge groove 420 of the housing 400 for the discharge to the outside while being caught by the guides 162 protruded from the top surface of the bottom ring 161.

In addition, as another embodiment of the lower end ring 160 and the bottom ring 161 as shown the above, the bottom end ring 15 shown in FIG. 3c may include an annular discharge groove 14 formed on top of the surface thereof so as to allow the draff to be discharged therethrough. In the meantime, the feed screw 300 may be constructed such that it includes crushing spirals 330 formed at the lower portion thereof to correspond to the grinding blades 130 in such a manner as to have an inclined angle larger than that of the screw spirals 320 of the feed screw 300 and to extend downwardly from or to be spaced apart from the screw spirals 320, so that when the material is crushed by the feed screw 300 and the grinding blades 13 of the mesh drums 100, 100a and 100b, a crushing force according to the intersection of the crushing spirals 330 and the grinding blades 130 is further increased in a state in which the feed screw 300 is accommodated in the mesh drums 100, 100a and 100b.

When the inclined angle of the crushing spirals 330 is close to 180°, i.e., is similar to the inclined angle of the screw spirals 320 of the feed screw 300, the material transfer force is further greatly exerted downwardly. On the contrary, when the inclined angle of the crushing spirals 330 is close to 90°, i.e., the crushing spirals 330 are generally oriented perpendicular to the screw spirals 320 of the feed screw 300, the material transfer force is further greatly exerted sidewardly, but not downwardly. Thus, the downward transfer of the material is maximally delayed so that the material can be finely crushed effectively for a long time period.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the abovementioned embodiments but should be defined by the appended claims and equivalents thereof.

As described above, according to the mesh drum and the juice extractor including the same in accordance with an embodiment of the present invention, grinding blades are positioned on the inner circumferential surface of the lower portion of the mesh drum, where mesh holes are not formed so that fine grinding the fine grinding process is performed, thereby improving a transfer efficiency of the material transferred downwardly by the feed screw as well as a compression force at the lower portion of the mesh drum. In addition, the material is further finely grinded by the grinding blades positioned on the inner circumferential surface of the lower portion of the mesh drum so that juice contained in the material can be extracted maximally. In addition, since the material is not accumulated in the mesh drum, they are easily put into the mesh drum.

What is claimed is:

1. A mesh drum for juice extraction, comprising:
   a mesh plate placed vertically and formed in a truncated conical hollow shape which is opened vertically and is gradually reduced in diameter as it goes toward the bottom from the top, and having a plurality of mesh holes formed on a side wall thereof so as to penetrate through the inner and outer wall surfaces thereof;
   at least one wall blades formed protrudingly on an inner circumferential surface of the mesh plate in the longitudinal direction of the mesh drum in such a manner as to position in proximity to screw spirals of a feed screw rotating inside the mesh plate; and
   at least one grinding blade formed on the inner circumferential surface of a lower portion of the mesh plate in the longitudinal direction of the mesh drum, the at least one grinding blade is located below the plurality of mesh holes;
   wherein the at least one grinding blades are extended from a lowermost end of the mesh plate;
   wherein the at least one grinding blades are arranged such that a distance between the grinding blades are shorter than a distance between the wall blades;
   wherein the at least one grinding blades do not extend above the plurality of mesh holes.

2. The mesh drum according to claim 1, wherein the mesh plate comprises at least one reinforcing ribs protrudingly formed on the inner circumferential surface thereof so as to position above the grinding blades.

3. The mesh drum according to claim 1, wherein the mesh plate comprises a reinforcing ring formed on the outer circumferential surface thereof so as to prevent deformation of the mesh plate.

4. The mesh drum according to claim 1, wherein the outer circumferential surface of a lower end of the mesh plate is reinforced by a lower end ring, and the at least one grinding blade are longitudinally formed in plural numbers on the inner circumferential surface of the lower end ring in such a manner as to be spaced apart from one another.

5. The mesh drum according to claim 4, wherein the lower end ring is partially bent inwardly at a lower end thereof to form the bottom ring, and the bottom ring includes a plurality of guides formed protrudingly upwardly from the top of the inner circumferential surface thereof.

6. The mesh drum according to claim 4, wherein the lower end ring is partially bent inwardly at a lower end thereof to form the bottom ring and the bottom ring has an annular discharge groove formed on the top surface thereof so as to allow the draff to be discharged therethrough.

7. The mesh drum according to claim 1, wherein the diameter of the mesh holes formed on the lower portion of the mesh plate is formed smaller than that of the plurality of mesh holes formed on the upper portion of the mesh plate.

8. The mesh drum according to claim 1, wherein the plurality of mesh holes are increased in diameter as it goes toward the outside from the inside of the mesh plate.

9. The mesh drum according to claim 1, wherein the each wall blade has a stepped part stepwise projected radially from the outer surface thereof at the intermediate portion of the mesh plate.

10. The mesh drum according to claim 1, wherein the protruding height of each wall blade is formed in such a manner that the wall blade is gradually inclined downwardly as it goes toward the bottom from the top of the mesh drum.

11. A juice extractor comprising:
the mesh drum according to claim 1;
a main body in which a motor as a drive source is mounted and from which a drive shaft of the motor is extended to the outside;
a feed screw connected to the drive shaft to receive a rotary force from the drive shaft, accommodated surroundingly in the mesh drum, and having screw spirals protrudingly formed on the outer circumferential surface thereof so as to be inclined downwardly;
a housing coupled to an upper portion of the main body so as to allow the mesh drum and the feed screw to be accommodated therein, the housing including:
a hollow through-part protrudingly formed at the center of a lower portion thereof, the hollow through-part having a through-hole formed at the center of an upper portion thereof so as to allow the drive shaft to pass therethrough and an annular discharge groove formed at the outer peripheral edge of a lower portion thereof; and
a draff outlet port and a juice outlet port formed respectively at one side and the other side of the discharge groove so as to be spaced apart from each other and fluidically communicate with the outside; and
a cover detachably coupled to the upper portion of the housing and including an inlet port formed at an upper portion thereof.

12. The juice extractor according to claim 11, wherein the feed screw includes at least one crushing spirals formed at the lower portion thereof to correspond to the at least one grinding blade of the mesh drum in such a manner as to have an inclined angle larger than that of the screw spirals of the feed screw and extend downwardly from the screw spirals.

13. The juice extractor according to claim 11, wherein the annular discharge groove is connected to a draff descending hole, and is gradually increased in depth as it goes toward the draff descending hole.

14. The juice extractor according to claim 11, further comprising a rotary brush positioned between the housing and the mesh drum and opened at the top and bottom thereof, the rotary brush including a blade made of a soft material formed at a side thereof so as to be brought into close contact at a distal end thereof with the inner circumferential surface of the housing and the outer circumferential surface of the mesh drum.

* * * * *